United States Patent [19]

Kihava et al.

[11] Patent Number: 5,014,233
[45] Date of Patent: May 7, 1991

[54] DIVIDER FOR CARRYING OUT HIGH SPEED ARITHMETIC OPERATION

[75] Inventors: Kouichi Kihava; Kazushige Yamamoto, both of Tokyo, Japan

[73] Assignee: OKI Electric Industry Co., Ltd., Japan

[21] Appl. No.: 467,689

[22] Filed: Jan. 19, 1990

[30] Foreign Application Priority Data

Jan. 24, 1989 [JP] Japan .................................. 1-13191

[51] Int. Cl.$^5$ ............................................... G06F 7/52
[52] U.S. Cl. ................................................. 364/766
[58] Field of Search ................ 364/764, 766, 767, 761

[56] References Cited

U.S. PATENT DOCUMENTS 4,692,891 9/1987 Yamaoka et al. .................... 364/766
4,891,780 1/1990 Miyoshi ............................... 364/766

OTHER PUBLICATIONS

D. C. Alexander et al., "Single Precision Arithmetic Algorithms", IBM Technical Disclosure Bulletin, vol. 15, No. 9, Feb. 1973, pp. 2976-2977.
C. A. Lemaire et al., "Improved Non-Restoring Division", IBM Technical Disclosure Bulletin, vol. 23, No. 3, Aug. 1980, pp. 1149-1151.

Primary Examiner—Dale M. Shaw
Assistant Examiner—Long T. Nguyen
Attorney, Agent, or Firm—Edward D. Manzo

[57] ABSTRACT

A divider for producing a quotient by dividing a dividend by a divisor has an A register for holding dividend data, and a B register for holding divisor data. An adder/subtracter or arithmetic unit produces either one of a sum and a difference between the dividend data and the divisor data held in the A register and the B register, respectively. A D flip-flop holds sign bit data which is included in result data representative of a result of operation as produced by the adder/subtracter. An inverting gate inverts the sign bit data. A register sequentially shifts, every time the inverted sign bit data is inputted, the inverted sign bit data from the least significant bit (LSB) position while holding the inverted sign bit data. A shifter arithmetically shifts the result data produced by the adder/subtracter one bit to the left while storing a (logical) ZERO in the LSB position, and feeds the resultant data to the A register. A loop counter controls the adder/subtracter, register and shifter such that iterative processing for division is repetitively executed.

12 Claims, 4 Drawing Sheets

DIVIDER FOR CARRYING OUT HIGH SPEED ARITHMETIC OPERATION

BACKGROUND OF THE INVENTION

1. Field of the Invention

The present invention generally relates to numerical arithmetic processing apparatus and, more particularly, to a divider suitable for microprocessors.

2. Description of the Prior Art

Conventional dividers have utilized a non-restoring method to divide binary numerical data. The dividers generally include a plurality of registers for storing a divisor, dividend, quotient and other similar values, and a shifter for effecting arithmetic shift.

In the non-restoring method, a quotient is obtained by subtracting a divisor from a dividend and sequentially repeating an arithmetic operation such as computation shift. Assuming that numerical data in a binary notation are divided, a binary number is represented in a numerical format of a fixed point and two's complement, as shown in FIG. 3. Then, a quotient Q is produced by dividing a dividend A by a divisor B, as follows:

$$Q = A/B \quad (1)$$

Given $$0 \leq A, \ 0 < B, \ A < 2B \quad (2)$$

then $$0 \leq Q < 2 \quad (3)$$

The numerical format of the quotient Q shown in FIG. 3 allocates one bit to a sign position, one bit to an integral part, and N bits to a fractional part.

A procedure for determining the quotient Q as represented by the equation (1) will be described with reference to FIG. 4. Assume that a binary divider divides a dividend A1 by a divisor B1. Then, the procedure depicted in FIG. 4 begins with a step 41 for loading a register Q assigned to a quotient with an initial value which is (logical) ZEROs. Registers A and B are loaded with the dividend A1 and the divisor B1, respectively. The divisor B1 is subtracted from the dividend A1, and the result of subtraction C1 is stored in a register C (step 42). If the result of subtraction C1 is positive as determined in a step 43, a (logical) ONE is stored in the register Q and arithmetically shifted one bit to the left. Let the resulting value in the register Q be C2 (step 44). At the same time, a value C3 produced by doubling the result C1 is written in the register A (step 45).

On the other hand, if the result of subtraction C1 is negative, a ZERO is stored in the register Q and arithmetically shifted one bit to the left in the register Q (step 46). The value so stored in the register Q is assumed to be C4. Further, a value A2 produced by doubling the value A1 is written in the register A (step 47).

The sequence of steps (steps 42 to 47) described above is repeated N+1 times where N is the number of bits allocated to the fractional part (loop 48). Consequently, a quotient Q is stored in the register C.

An ordinary microprocessor lacks an exclusive hardware for executing division as discussed above. Such a microprocessor has a disadvantage that it takes several to several tens of machine cycles per digit of a quotient so that it is difficult to realize a high speed division operation.

SUMMARY OF THE INVENTION

It is therefore an object of the present invention to provide a divider which has a simple circuit construction and can perform a binary number division processing within a short period of time.

A divider for producing a quotient by dividing a dividend by a divisor includes a first holding circuit for holding dividend data representative of the dividend, and a second holding circuit for holding divisor data representative of the divisor. An operating unit produces either one of a sum and a difference between the dividend data held in the first holding circuit and the divisor data stored in the second holding circuit. A third holding means holds sign bit data which is included in result data representative of a result of operation produced by the operating unit. An inverting circuit inverts the sign bit data to produce inverted sign bit data. A first shifting circuit sequentially shifts, every time the inverted sign bit data from the inverting circuit is inputted, the inverted sign bit data from the least significant bit (LSB) position while holding the inverted signal bit data. A second shifting circuit arithmetically shifts the resultant data produced by the operating unit one bit to the level while storing a (logical) ZERO in the LSB position, and feeds the resultant data to the first holding circuit. A controller controls the operating unit and the first and second shifting circuits such that iterative processing for division is repetitively executed.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
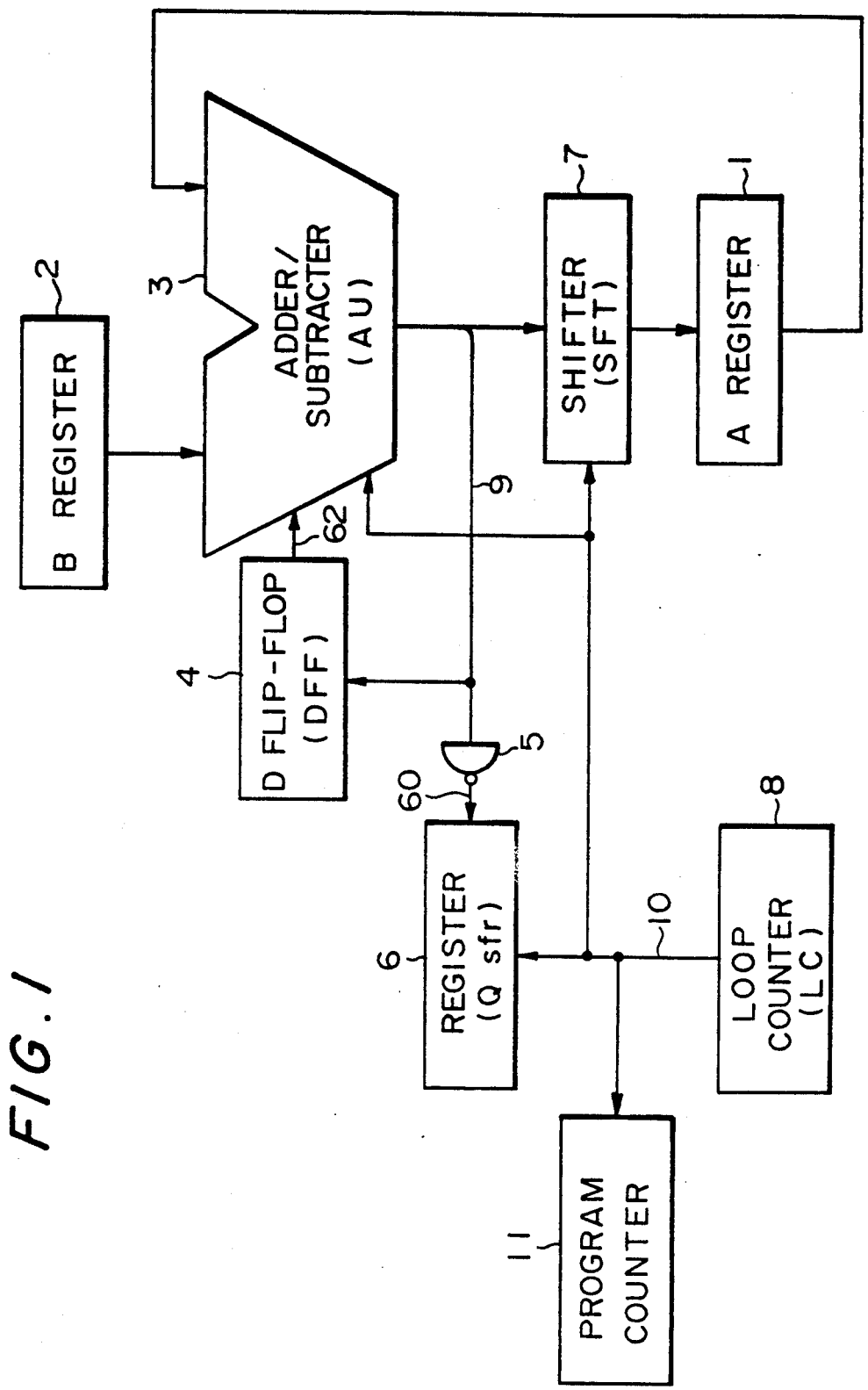
FIG. 1 is a schematic block diagram showing an embodiment of the divider in accordance with the present invention.
Figure 3:
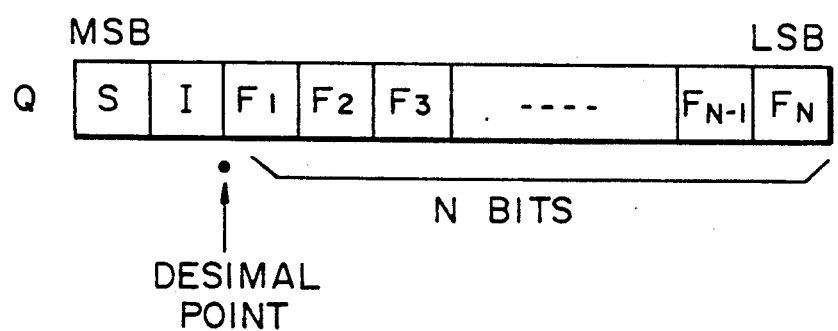
FIG. 3 shows a specific numerical format applicable to the divider shown in FIG. 1.
Figure 4:
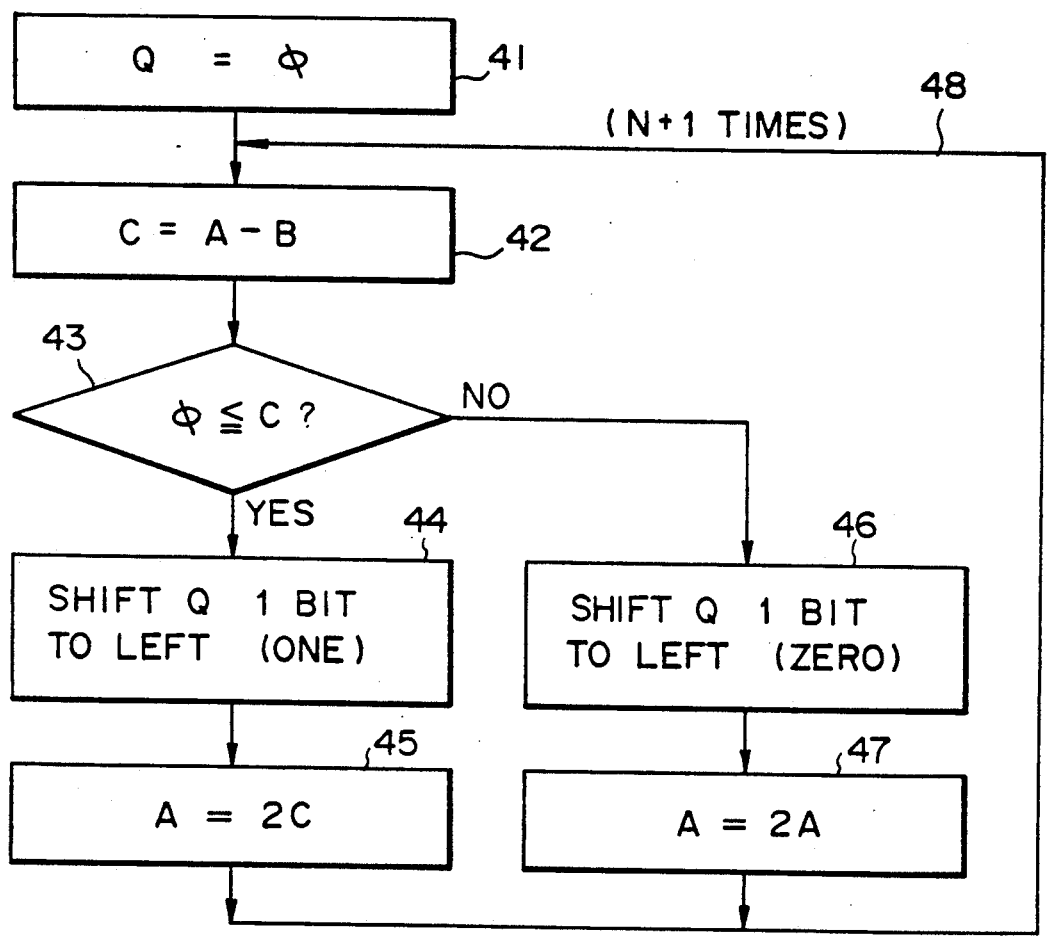
FIG. 4 is a flowchart representative of an operating sequence particular to a prior art divider.

Referring to FIG. 1 of the drawings, a divider embodying the present invention is built in a microprocessor, for example. The illustrative embodiment divides a binary dividend A by a divisor B where A and B are both positive and B is assumed to be at least one-half as large as A, i.e. $(0 < A, \ 0 < B, \ A < 2B)$. A binary numerical data format is formed of two's complements and a fixed point, as shown in FIG. 3. Hence, the quotient Q obtained by dividing A by B will be between zero and two, i.e.

$$0 \leq Q < 2$$

In FIG. 3, the numerical format has one bit for a sign position, one bit for an integral part, and N bits for a fractional part.

The divider shown in FIG. 1 has an adder/subtracter or arithmetic unit (AU) 3, a B register 2, and an A register 1. The B register 2 is interconnected to one input terminal of the adder/subtracter 3, while the A register 1 is interconnected to another input terminal of the adder/subtracter 3 via a shifter (SFT) 7. The divider also has an inverting gate 5, a D flip-flop (DFF) 4, a loop counter (LC) 8, and a shift register (Q sfr) 6.

The A register 1 and the B register 2 serve as a circuit for storing a dividend and a divisor, respectively. The D flip-flop 4 holds a sign bit (SGN) 9 of an operational result from the adder/subtracter 3 for one machine cycle. The inverting gate 5 inverts the sign bit 9 of the output of the adder/subtracter 3 and feeds the inverted sign bit to the shift register 6.

Figure 2:
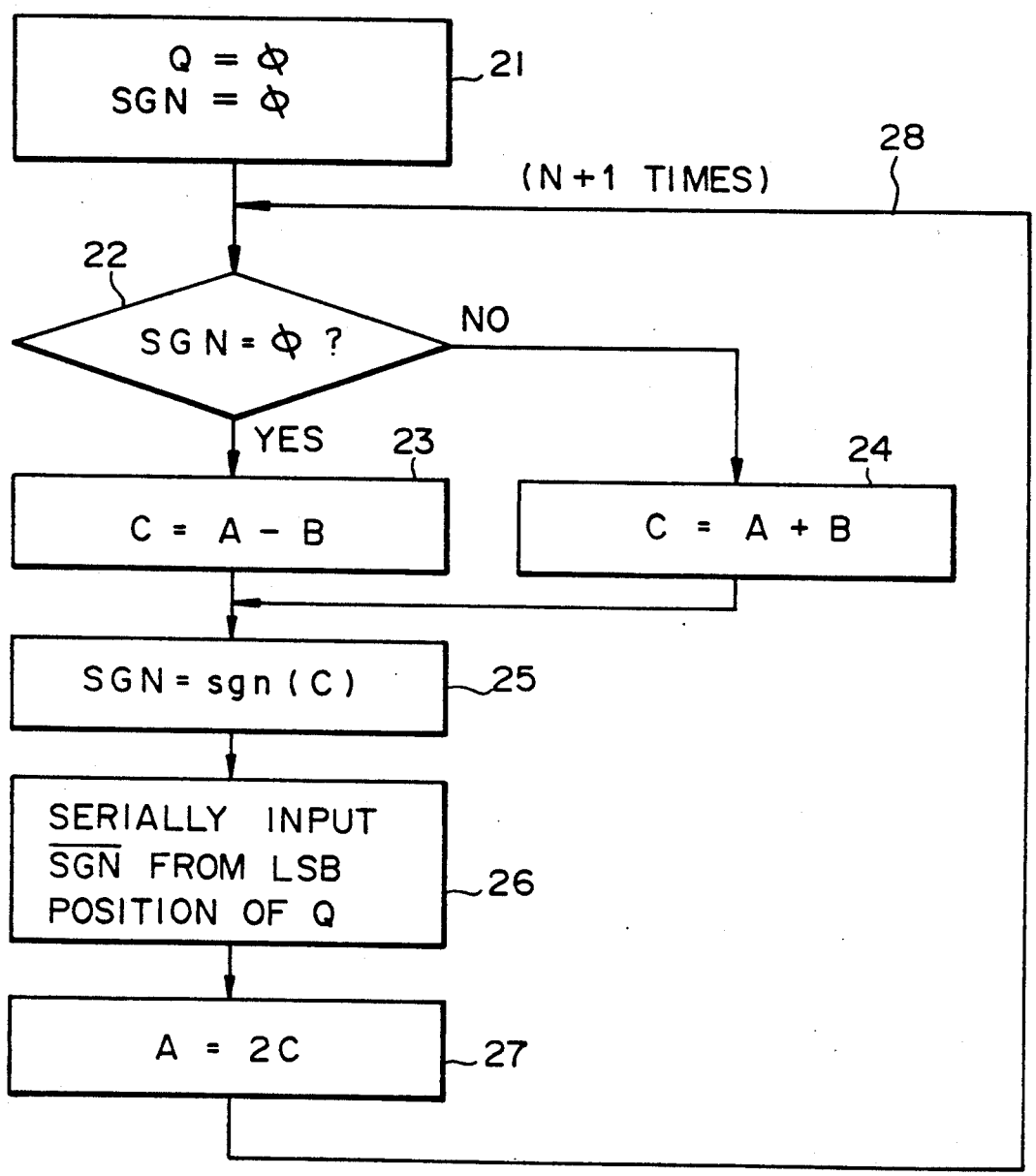
FIG. 2 is a flowchart demonstrating a specific operation of the divider shown in FIG. 1.

The loop counter 8 is initialized to the repeated number N+1 which is needed for the divisional operation 27 shown in FIG. 2. The loop counter 8 is decremented every time the iterative processing completes and will be decremented to zero in the end.

While the loop counter 8 is sequentially decremented toward 0 (zero) during the division, it maintains a control signal 10 active to inform the adder/subtracter 3, shift register 6, shifter 7 and program counter 11 of the fact that the division process is under way.

The shift register 6 sequentially shifts, only when division processing is under way, the output 60 of the inverting gate 5 to the left from the lowermost bit position or least significant bit (LSB) position until it stores the entire quotient Q. The shifter 7 stores the output of the adder/subtracter 3 only when division processing is being executed; the numerical data is arithmetically shifted one bit to the left in the shifter 7 with a ZERO being stored in the LSB position. The resulting data is fed from the shifter 7 to the A register 1.

The adder/subtracter 3 is implemented as an arithmetic operational circuit for performing addition or subtraction with the outputs of the A register 1 and B register 2. Whether the arithmetic operational unit 3 should add or subtract is determined by referencing the output 62 of the D flip-flop 4, only if the division processing is under way. Specifically, subtraction and addition are selected when the output 62 of the flip-flop 4 is a ZERO and a ONE, respectively.

A division procedure particular to the illustrative embodiment has a unique algorithm, as follows. The quotient Q indicated by the equation (1) is produced by a specific sequence of steps as shown in FIG. 2.

In FIG. 2, a dividend A and a divisor B are stored beforehand in the A register 1 and the B register 2, respectively. The loop counter 8 is initially loaded with the number of times N+1 that the iterative operation for division should be executed. Here, N equals the number of bits allocated to the fractional part of the numerical format of the quotient. The shift register 6 and D flip-flop 4 are reset at first, i.e., a ZERO is stored in all of their bits.

After the initialization stated above, a step 21 is executed to select a ZERO for a quotient Q and a ZERO for a variable SGN. The variable SGN is an output of the D flip-flop 4 and one-bit information which is representative of a sign. On completing the step S21, the program executes the following steps in response to a division command. Specifically, whether or not the variable SGN is a ZERO is determined (step 22). If the answer of the step S22 is YES, a step 23 is executed for subtracting the divisor B from the dividend A and storing the result as a residue C. More specifically, in the step 23, the adder/subtracter 3 subtracts the divisor B stored in the B register from the dividend A stored in the A register 1. Since the output 62 of the D flip-flop 4 is a ZERO without exception immediately after the start of a division command, the step 23 is necessarily executed.

If the answer of the step S22 is NO, i.e., if the variable SGN is a ONE, the dividend A and the divisor B are summed up (step 24). More specifically, if the output 62 of the D flip-flop 4 is a ONE, the adder/subtracter 3 sums up the numerical data stored in the A register 1 and B register 2.

The step 23 or 24 is followed by a step 25 for substituting the sign bit data of the result C of subtraction or addition for the variable SGN. The sign bit data is a ZERO when the result C is positive and a one when it is negative. More specifically, the sign bit 9 of the output of the adder/subtracter 3 as determined by the step 23 or 24 and which is either a ZERO or a ONE is loaded in the D flip-flop 4.

In the following step 26, the inverted sign bit $\overline{SGN}$ of the resultant data having been produced by the step 23 or 24 is serially written in the register 6 while being sequentially shifted from the LSB position. The inverted bit $\overline{SGN}$ is a ONE or a ZERO when the result of operation C is positive or negative, respectively. Specifically, the data of the sign bit 9 outputted by the adder/subtracter 3 as a result of the step 23 or 24 is inverted by the inverting gate 5 and then sequentially loaded in the register 6 while being serially shifted from the LSB position.

In a step 27 which follows the step 26, the result C of the step 23 or 24 is arithmetically shifted by one bit to the left and a ZERO is stored in the LSB position of the register A. The resulting value, i.e., a value produced by doubling the result C is stored in the register A. Specifically, the output of the adder/subtracter 3 representative of the result of the step S23 or 24 is doubled by the shifter 7 and then stored in the register 1.

The sequence of steps 22 to 27 described above is repeated N+1 times in total (loop 28). Specifically, every time the above-described sequence is completed, the loop counter 8 is decremented by 1 (one). The steps 22 to 27 are repetitively executed until the loop counter 8 reaches 0 (zero). While such division processing is under way, the control signal from the loop counter 8 prevents a program counter 11 built in the microprocessor for holding the address of a command to be read out next from being updated.

In FIG. 1, the shifter 7 shown may be connected between the A register 1 and the adder/subtracter 3, as will be understood from the above description. The divider according to the present invention can be implemented without requiring any special circuit. This is because an ordinary microprocessor, especially a digital signal processor, customarily utilizes registers, shift registers, an arithmetic and logical unit, a flag register for storing sign bit associated with a result from the calculation of the arithmetic and logical unit, a loop counter, and a barrel shifter. Hence, the divider according to the present invention needs only a minimum of additional hardware such as the D flip-flop 4 of FIG. 1. Furthermore, a single machine cycle of a processor suffices for the sequence of steps 22 to 27 to be repeated N+1 consecutive times.

In summary, it will be seen that the present invention provides a divider which is operable at a high speed and has a simple construction. This unprecedented advantage is derived from the unique procedure wherein a dividend and a divisor are subjected to addition or subtraction depending on sign bit which is included in difference data or sum data of the dividend and divisor, then the sign bit data is inverted, and then the inverted sign bit is serially inputted into a shift register assigned to a quotient from the LSB position of the data.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A divider for producing a quotient by dividing a dividend by a divisor, comprising:
   first holding means for holding dividend data representative of the dividend;
   second holding means for holding divisor data representative of the divisor;
   operating means for producing either one of a sum and a difference between the dividend data held in said first holding means and the divisor data stored in said second holding means;
   third holding means for holding sign bit data which is included in result data representative of a result of operation produced by said operating means;
   inverting means for inverting the sign bit data to produce inverted sign bit data;
   first shifting means for sequentially shifting, every time the inverted sign bit data from said inverting means is inputted, said inverted sign bit data from a least significant bit (LSB) position while holding said inverted sign bit data;
   second shifting means for arithmetically shifting the result data produced by said operating means one bit to the left while storing a (logical) ZERO in an LSB position, and feeding resultant data to said first holding means; and
   control means for controlling said operating means, said first shifting means and said second shifting means such that iterative processing for division is repetitively executed.

2. A divider in accordance with claim 1, wherein said operating means produces the sum or the difference on the basis of the sign bit data held by said third holding means.

3. A divider in accordance with claim 2, wherein said first holding means comprises an A register for holding the dividend data;
   said second holding means comprising a B register for holding the divisor data;
   said operating means comprising an adder/subtracter for producing the sum or the difference between the dividend data and the divisor data;
   said third holding means comprising a D flip-flop for holding the sign bit data which is included in resultant data produced by said adder/subtracter;
   said inverting means comprising an inverting gate for inverting the sign bit data;
   said first shifting means comprising a shift register for holding the inverted sign bit data outputted by said inverting gate while sequentially shifting said inverted sign bit data from the LSB position every time said inverted sign bit data is inputted to said first shifting means;
   said second shifting means comprising a shifter for arithmetically shifting the result data produced by said operating means one bit to the left while storing a ZERO in the LSB position, and feeding resulting data to said first holding means; and
   said control means comprising a loop counter for controlling said operating means, said first shifting means and said second shifting means such that the iterative processing for division is repetitively executed.

4. A divider in accordance with claim 3, wherein the quotient to be stored in said shift register which constitutes said first shifting means has a format having one bit for a sign position, one bit for an integral part and N bits for a fractional part and is represented by a fixed point and two's complement.

5. A divider in accordance with claim 4, wherein said adder/subtracter produces the difference between the dividend and the divisor when the sign bit data held by said D flip-flop is a ZERO and produces a sum of said dividend and said divisor when said sign bit data is a (logical) ONE.

6. A divider in accordance with claim 5, wherein said loop counter is loaded with the number of times N+1 (N being the number of bits allocated to the fractional part of the numerical format of the quotient) that there should be repeated an iterative sequence consisting of:
   a first step of determining whether or not, among the result data produced by said adder/subtracter, the sign bit data is a ZERO;
   a second step of producing the sum or the difference between the dividend stored in said A register and the divisor stored in said B register, depending on the sign bit data;
   a third step of inputting the sign bit data included in the resultant data produced by said second step in said D flip-flop;
   a fourth step of serially inputting in said shift register, which is to store a value Q as the quotient, the inverted sign bit data of the resultant data produced by said second step from the LSB position of said shift register; and
   a fifth step of doubling the result data produced by said second step and storing a doubled result in said A register;
   said loop counter being decremented every time said sequence completes and causing said sequence to be repeated until said loop counter reaches 0 (zero).

7. A divider in accordance with claim 6, wherein said divider is built in a microprocessor which comprises a program counter for holding an address of a command to be read out next, said loop counter feeding to said program counter a control signal which inhibits said program counter from being updated until said sequence has been repeated N+1 times.

8. A divider in accordance with claim 7, wherein said microprocessor comprises a digital signal processor.

9. A divider in accordance with claim 3, wherein said D flip-flop holds the sign bit data for one machine cycle during which a division command is executed.

10. A machine-implemented iterative method of performing high speed division of a dividend by a divisor to obtain a quotient comprising the steps of:
   (a) storing dividend data representative of the dividend and divisor data representative of the divisor in respective first and second electronic storage means;
   (b) storing initial data in a third electronic storage means for sign bit data;
   (c) configuring an adder/subtractor in circuit with said first, second, and third storage means for receiving the dividend data and the divisor data and for producing sign bit data and selectively either the sum or the difference between them depending on a control signal;

(d) performing an iterative process having the steps of (i) determining whether stored sign bit data has a predetermined logical value; then (ii) operating said adder/subtractor to produce the sum or difference between the dividend data in the first storage means and the data in the second storage means, the operating step also producing new sign bit data, the operating step including using the stored sign bit data from the third storage means as the control signal;

(iii) storing the new sign bit data in the third storage means;

(iv) inverting the new sign bit data and storing inverted new sign bit data in a fourth storage means;

(v) modifying the data outputted by the adder/subtractor and storing the modified data in the first storage means; and (vi) decrementing a loop count each time the aforementioned iterative process occurs, and repeating said iterative process until the loop count reaches a reference count, whereby the data stored in the fourth storage means represents the quotient.

11. The method of claim 10 wherein said step of inverting and storing includes shifting inverted sign bit data from the least significant bit (LSB) position each time that inverted new sign bit data is stored to the fourth storage means.

12. The method of claim 10 wherein said step of modifying includes shifting data to the left while storing a logical ZERO in the LSB position.

* * * * *

UNITED STATES PATENT AND TRADEMARK OFFICE
CERTIFICATE OF CORRECTION

PATENT NO. : 5,014,233

DATED : May 7, 1991

INVENTOR(S) : Kouichi Kihara, Kazushige Yamamoto

It is certified that error appears in the above-identified patent and that said Letters Patent is hereby corrected as shown below:

ON TITLE PAGE: Item [75]

"Kihava et al." should read -- Kihara et al. --;

"Kouichi Kihava" should read -- Kouichi Kihara --.

Signed and Sealed this

Fifteenth Day of September, 1992

Attest:

DOUGLAS B. COMER

*Attesting Officer*         Acting Commissioner of Patents and Trademarks